United States Patent [19]
Spillner

[11] Patent Number: 6,145,309
[45] Date of Patent: Nov. 14, 2000

[54] METHOD FOR CONTROLLING THE STEERING VOLUME FLOW OF A HYDRAULIC POWER-ASSISTED STEERING UNIT FOR MOTOR VEHICLES

[75] Inventor: Robert Spillner, Düsseldorf, Germany

[73] Assignee: TRW Fahrwerksysteme GmbH & Co. KG, Dusseldorf, Germany

[21] Appl. No.: 09/134,313

[22] Filed: Aug. 14, 1998

[30] Foreign Application Priority Data

Aug. 16, 1997 [DE] Germany ............................ 197 35 647

[51] Int. Cl.⁷ ............................ F16D 31/02; G05D 11/00
[52] U.S. Cl. ................................ 60/413; 91/459; 137/114; 137/496
[58] Field of Search .......................... 60/384, 413, 414, 60/415, 418, 421, 422; 137/114, 496, 505.14; 251/129.08, 129.15

[56] References Cited

U.S. PATENT DOCUMENTS

| | | | |
|---|---|---|---|
| 1,321,856 | 11/1919 | Slater | 137/114 |
| 1,643,305 | 9/1927 | Lalor | 137/496 |
| 3,640,301 | 2/1972 | Jania | 60/418 X |
| 3,785,393 | 1/1974 | Tanguy | 60/418 X |
| 3,841,095 | 10/1974 | Baker | 60/413 X |
| 3,952,076 | 4/1976 | Chatelain et al. | 137/625.12 X |
| 4,002,220 | 1/1977 | Wible | 60/422 X |
| 4,146,594 | 3/1979 | Raud | 137/625.12 X |
| 4,192,337 | 3/1980 | Alderson et al. | 60/413 X |
| 4,204,584 | 5/1980 | de Might | 60/413 X |
| 4,217,968 | 8/1980 | Dezelan | 137/102 X |
| 4,223,694 | 9/1980 | Kervagoret | 60/418 X |
| 4,242,867 | 1/1981 | Belart | 60/413 X |
| 4,303,089 | 12/1981 | Gage et al. | 137/113 |
| 4,337,620 | 7/1982 | Johnson | 60/418 |
| 4,430,859 | 2/1984 | Hirsch | 60/418 |
| 4,516,553 | 5/1985 | Lindberg | 137/114 X |
| 4,574,904 | 3/1986 | Goode | 60/404 X |
| 5,067,687 | 11/1991 | Patel et al. | 251/129.08 |
| 5,163,477 | 11/1992 | Takano et al. | 137/625.65 |
| 5,167,442 | 12/1992 | Alaze et al. | 251/129.02 X |
| 5,178,359 | 1/1993 | Stobbs et al. | 251/129.08 X |
| 5,375,506 | 12/1994 | Hashida et al. | 91/446 |
| 5,547,165 | 8/1996 | Brehm et al. | 251/129.08 X |
| 5,549,361 | 8/1996 | Sorensen | 60/420 X |
| 5,727,389 | 3/1998 | Harries | 60/418 |

FOREIGN PATENT DOCUMENTS

44099928  9/1995  Germany .

OTHER PUBLICATIONS

"Elektrisch abschaltbare Antriebseinheiten fur Lenksysteme im Pkw", ATZ Automobiltechnische Zeitschrift 98 (1996), pp. 254–261.

Primary Examiner—John E. Ryznic
Attorney, Agent, or Firm—Tarolli, Sundheim, Covell, Tummino & Szabo L.L.P.

[57] ABSTRACT

A apparatus for use with an open center steering valve (3) of a hydraulic power-assisted steering unit of a motor vehicle. The apparatus comprises an electric motor operated pump (5) and a hydraulic accumulator (7) for storing a pressurized quantity of hydraulic fluid. The hydraulic accumulator (7) is hydraulically connected to the pump (5). The pump (5) supplies the pressurized hydraulic fluid to the hydraulic accumulator (7). The apparatus further comprises a valve arrangement (10) for controlling hydraulic fluid flow from the hydraulic accumulator (7). The valve arrangement (10) has a riser (25), a slide valve (19), a valve seat (21), and an electromagnet. The riser (25) is hydraulically connected to the pump (5). The valve seat (21) has an opening which hydraulically connects the riser (25) and the hydraulic accumulator (7). The slide valve (19) is located within the electromagnet of the valve arrangement (10) and is movable by the electromagnet from a position blocking the valve seat opening and preventing hydraulic fluid flow from the accumulator (7) to the riser to a position clearing the valve seat opening and allowing hydraulic fluid flow from the accumulator (7) to the riser (25). The apparatus further comprises an electronic control unit (6) for controlling the electromagnet and the movement of the slide valve (19).

23 Claims, 3 Drawing Sheets

METHOD FOR CONTROLLING THE STEERING VOLUME FLOW OF A HYDRAULIC POWER-ASSISTED STEERING UNIT FOR MOTOR VEHICLES

TECHNICAL FIELD

The invention relates to a method for controlling the steering volume flow of a hydraulic power-assisted steering unit for motor vehicles, wherein an electric motor driven pump pressurizes with a pressure fluid an open center steering valve and a hydraulic accumulator that is hydraulically separable from the steering valve by means of a valve arrangement. A further subject of the invention is a valve arrangement and a valve arrangement with integrated accumulator charging function for implementing this method.

BACKGROUND OF THE INVENTION

In power-assisted steering units with open center or OC steering valves, if the steering valve is in neutral position, the pump pumps a pressure fluid at low pressure through the open valve into a reservoir. The steering valve serves to supply hydraulic pressure to a control member comprising, in a manner known per se, an input shaft, an output shaft, a torsion rod connected by its one end to the input shaft and by its other end to the output shaft, and a valve sleeve surrounding the input shaft. The input shaft is connected with a steering rod while the output shaft engages with a rack by means of a pinion. If the input shaft is twisted in relation to the valve sleeve, hydraulic pressure is provided to support the steering motion in the corresponding direction. It is known to use a separate electric motor to drive the pump that delivers the pressure fluid such that on the one hand steering is available even if the drive motor of the motor vehicle is shut off and on the other hand the power consumption of the electric motor can be electronically controlled to permit power output to the pump as needed. Such a steering system permits a reduction of up to 75% in the proportional gasoline consumption of a power-assisted steering unit. The capacity of the electric motor pump arrangement is decisively determined by the power input, which is limited by the automobile industry. It is approx. 60 to 80 ampere for an electrical system voltage of typically 13.5 volt. This limit does not significantly affect the power-assisted steering of smaller vehicles with a front axle load of less than 600 kg. But with heavier vehicle classes (900 to 1200 kg) or high steering reduction ratios it clearly limits the performance compared to conventional power-assisted steering units. This is expressed by the so-called "catch-up effect" which, on rapid turning of the steering wheel, for example while the vehicle is stationary, causes the driver to momentarily notice a sluggish steering response because the steering volume flow decreases above a critical point. With a demand-based design of the motor pump arrangement, the maximum performance of the steering system cannot be increased if power consumption is subject to a given maximum limit.

DE 44 09 928 A1 discloses a hydraulic actuator for axle steering of a motor vehicle distinguished by an increased dynamic in the steering operation with reduced energy consumption. This is achieved in that an OC steering valve is pressurized with a pressure fluid from a pressure fluid supply unit comprising an electric motor driven pump and a hydraulic accumulator that is hydraulically separated from the steering valve by a stop valve designed as a seat valve. A pressure sensor monitors the pressure of the hydraulic accumulator and the corresponding signals are used to control the electric motor. A flow control valve is used to divert a steering fluid flow and to deliver it to the steering valve via a stop valve bypassing the steering control. The pressure increase produced by actuating the steering valve causes the stop valve to open so that an additional volume flow passes from the hydraulic accumulator to the steering valve to support the steering motion.

The disadvantage of the prior art hydraulic actuator is that activation of the steering valve causes oil to be continuously withdrawn from the hydraulic accumulator, which is under high pressure even if the steering pressures are small. This has a negative effect on the energy balance since the throttling losses cause unnecessary heating of the oil. Consequently, the hydraulic accumulator must be frequently recharged, which increases the average power requirement of the electric motor. This, in turn, negatively affects the proportional gasoline consumption of the steering system compared to the above described 75%.

The object of the invention is to further develop a method of the initially described type and, within the current framework prescribed by the automobile industry, to provide a steering volume flow based on need which exceeds the maximum pump output without increasing average power consumption.

SUMMARY OF THE INVENTION

According to the invention, this object is attained by measuring the change in the system pressure that is produced by activating the steering valve and using this as a control parameter for the valve arrangement to control an equilibrium established in the closed position of the valve arrangement between prevailing system pressure and closing pressure of the valve arrangement on the one hand and hydraulic accumulator pressure on the other hand in such a way that if the steering pressure on the steering valve suddenly drops because of a decrease in the steering volume flow, the valve arrangement is automatically opened and the steering volume power consumption is compensated by a demand-based supply of pressure fluid from the hydraulic accumulator.

The method according to the invention takes into account the catch-up effect that occurs above a critical pressure. Moreover, for heavy vehicles, an adequate steering rate is obtained without exceeding the maximum 80 ampere current consumption of the electric motor.

A particular advantage is achieved if the hydraulic accumulator is charged by a protective non-return valve and an accumulator charging valve. This provides a design that is cost effective and keeps energy losses low.

According to a particularly advantageous proposal by the invention, the volume flow leaving the pump is throttled by the accumulator charging valve as a function of the pressure prevailing in the hydraulic accumulator in order to deliver a portion of the volume flow via the non-return valve to the hydraulic accumulator if the latter is depleted.

According to one characteristic of the invention, the closing pressure of the valve arrangement is changed as a function of the prevailing system pressure so as to obtain an equilibrium between the prevailing system pressure and the closing pressure on the one hand the and hydraulic accumulator pressure on the other hand. Advantageously, the changes in the closing pressure are proportional to the changes in the system pressure so that there is no overall change on the side of the equilibrium that comprises the system pressure and the closing pressure.

According to a further characteristic of the invention, the changes in the system pressure are detected by sensors or via the power consumption of the electric motor driving the pump and converted by an electronic control unit into control signals for the valve arrangement. It is particularly advantageous if, upon reaching a critical level of the delivery pressure, the closing pressure of the valve arrangement is kept constant for a predetermined time span to cause the valve arrangement to open as a result of the equilibrium established in the valve arrangement. Advantageously, the electronic control unit also controls the power consumption of the electric motor and thus the pump output to achieve a demand-based delivery of the pressure fluid.

To attain the aforementioned object, the invention furthermore proposes a valve arrangement for controlling a hydraulic accumulator of a hydraulic assisted-steering unit for motor vehicles which is pressurized by a pressure fluid, characterized by an electromagnetically displaceable slide valve used to close a valve seat that is hydraulically connected with the hydraulic accumulator and a riser through which is directed a steering volume flow produced by an electric motor driven pump for an open center steering valve of the hydraulic power-assisted steering unit, whereby the slide valve is pressurized in the direction of the valve seat by the pressure of the steering volume flow present in the riser.

The inventive embodiment of the valve arrangement permits the implementation of the above described method, that is, in the case of a "catch-up situation" an additional volumetric flow is provided without increasing the power consumption of the pump beyond a predetermined maximum current input value, for example 80 ampere. This is based on the fact that in a "catch-up situation" any sudden drop in the volumetric flow in the riser is accompanied by a simultaneous drop in the pressure of the riser. This causes the equilibrium of the forces acting on the slide valve to be changed in such a way that the slide valve moves to its open position and the required steering volume flow flows out of the hydraulic accumulator.

According to one characteristic of the invention, the magnetic force acting on the slide valve is controlled as a function of the pressure prevailing on the pressure side of the pump. This is to ensure that in the absence of a "catch-up situation" the slide valve is in an equilibrium position closing the valve seat. For this purpose, the pressure changes in the steering volume flow of the riser that are produced by the steering movement and also act on the slide valve are compensated by the counteraction of the magnetic force. If there is no "catch-up situation," the pressure in the riser equals the pressure existing on the pressure side of the pump so that the closing position of the slide valve may be regulated by controlling the magnetic force as a function of the pressure on the pressure side of the pump.

It is particularly advantageous if a spring element furthermore loads the slide valve in the direction of the valve seat to ensure a closing position of the slide valve even if the electromagnet is not excited. According to an additional characteristic of the invention, the pressure force of the slide valve applied to the valve seat by the spring element is at least as great as the opening force acting against the slide valve through the pressure of the hydraulic accumulator in its charged state so that the slide valve can be move a to an open position only by the magnetic force produced by the electromagnet.

In a preferred embodiment, the end of the slide valve facing away from the valve seat is arranged in a chamber having the pressure of the steering volume flow in the riser such that the steering volume flow pressure present in the riser is applied to the slide valve in the direction of the valve seat in a simple manner. The chamber is advantageously hydraulically connected with the riser so that the pressure in the riser corresponds to that in the chamber. It is particularly advantageous if the spring element is disposed inside the chamber to achieve the most compact design possible.

According to an additional feature of the invention, the displacement direction of the slide valve is orthogonal to the longitudinal axis of the riser so that in the open position of the slide valve, a demand-based volumetric flow from the hydraulic accumulator is obtained without loss. Advantageously, at least one section of the slide valve is arranged so as to penetrate the riser to permit a compact design of the valve arrangement.

To attain said object, the invention furthermore proposes a valve arrangement for controlling a hydraulic accumulator pressurized with a pressure fluid and for throttling a steering volume flow produced by an electric motor driven pump in an OC control valve of a hydraulic power-assisted steering unit for motor vehicles characterized by a slide valve that can be actuated electromagnetically and is used to close a valve seat that is hydraulically connected with the hydraulic accumulator, a riser through which the steering volume flow of the steering valve is directed, and a displaceable sleeve that is spring-loaded at its end face in the direction of the valve seat, that surrounds the slide valve and that is capable of throttling the riser. The slide valve is pressurized in the direction of the valve seat by the steering volume flow pressure present in the riser and the end face of the sleeve facing away from the spring-loaded end face is pressurized with the pressure of the hydraulic accumulator.

This embodiment of the valve arrangement according to the invention also permits the realization of the above method for controlling the steering volume flow in a hydraulic power-assisted steering unit for motor vehicles. It offers the advantage of providing not only the function of hydraulic accumulator control but also the possibility of throttling the steering volume flow, which corresponds to the function of an accumulator charging valve in the above described method. For this purpose, the hydraulic accumulator is controlled in the same manner as in the earlier described valve arrangement. In other words, in a "catch-up situation" the magnetic force acting on the slide valve moves the slide valve into its open position so as to provide a demand-based supply of pressure fluid from the hydraulic accumulator. The accumulator charging function is achieved by the displaceable sleeve. If the hydraulic accumulator is not charged, the sleeve is displaced due to the spring force acting on it in such a way that an inlet opening incrementally narrows so as to throttle the volumetric flow upstream from the valve arrangement and enable the hydraulic accumulator to be charged.

In a preferred embodiment of the invention, the slide valve is run parallel to the inner wall of the sleeve to provide a radial plain bearing. According to an additional characteristic of the invention, the sleeve is arranged so as to penetrate the riser to permit throttling of the steering volume flow in the riser.

With charged accumulator, the sleeve advantageously has an inlet and an outlet opening in the area of the riser to permit flow through the riser. It is particularly advantageous if moving the sleeve permits moving the inlet opening out of the riser area so as to block the riser. It is furthermore advantageous if the outlet opening diameter is equal to the riser diameter while the inlet opening diameter is smaller so as to minimize pressure losses on the outlet side and provide the shortest possible displacement path for the slide valve to completely block the riser. The invention furthermore proposes to arrange the inlet and outlet openings offset to each other to provide an additional volumetric flow from the hydraulic accumulator to the outlet opening if the hydraulic accumulator is being charged or if the inlet is throttled.

It is also advantageous if the magnetic force acting on the slide valve is in turn controlled as a function of the pressure prevailing on the pressure side of the pump. Furthermore, it is advantageous if the slide valve is also spring-loaded in the direction of the valve seat.

In a preferred embodiment, the pressure force applied to the valve seat by the spring element is at least equal to the opening force acting against the slide valve due to the pressure of the charged hydraulic accumulator. This keeps the slide valve in closed position if the electromagnet is not excited.

It is advantageous if the end of the slide valve facing away from the valve seat is disposed in a chamber formed in the interior of the sleeve, where the pressure is the same as the pressure of the steering volume flow prevailing in the riser such that the steering volume flow pressurizes the slide valve in the direction of the valve seat. For this purpose, according to a further characteristic of the invention, the chamber is hydraulically connected with the riser. To achieve a particularly compact design of the valve arrangement, the invention furthermore proposes that the spring element be disposed inside the chamber.

Finally, the invention proposes that the displacement direction of the slide valve be orthogonal to the longitudinal axis of the riser and that at least a section of the slide valve project into the riser to ensure automatic delivery of pressure fluid from the hydraulic accumulator in a "catch-up situation."

BRIEF DESCRIPTION OF THE DRAWINGS

Further advantages and characteristics of the subject of the invention result from the following description of the associated drawing, which shows the method according to the invention and two embodiments of inventive valve arrangements to implement the method according to the invention.

DETAILED DESCRIPTION OF THE INVENTION

Figure 1:
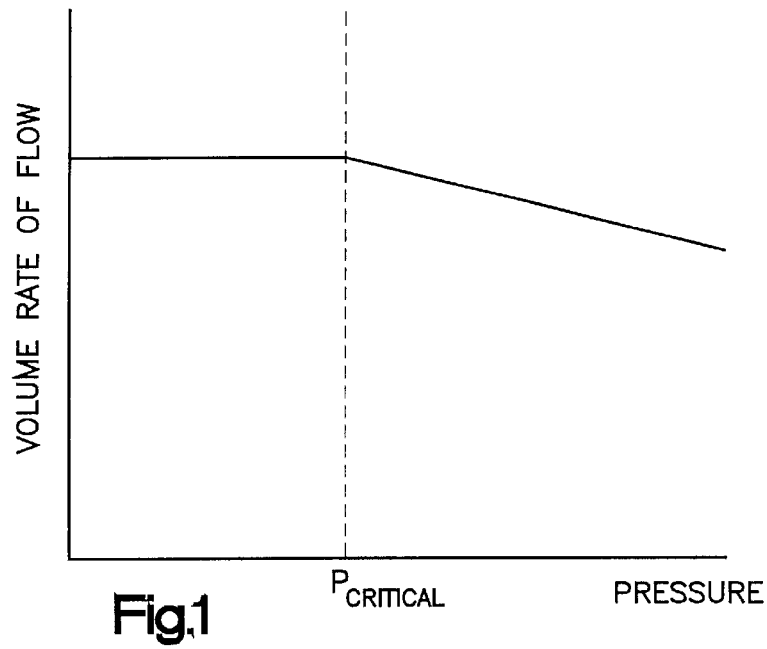
FIG. 1 is a volume flow pressure diagram.

As FIG. 1 qualitatively shows, the volume rate of flow and thus also the steering volume flow, decreases above a critical pressure which occurs, for example, if a steering wheel is quickly turned while the motor vehicle is stationary. The driver temporarily notices a sluggishness in the steering due to the so-called catch-up effect. To compensate this drop in steering volume flow, pump output would have to be increased. However, pump output can be increased only by additional current input to the motor, which runs counter to current specifications issued by the automobile industry. The method according to the invention compensates the decrease in the steering volume flow by automatically supplying pressure fluid from a hydraulic accumulator on a demand-basis.

Figure 2:
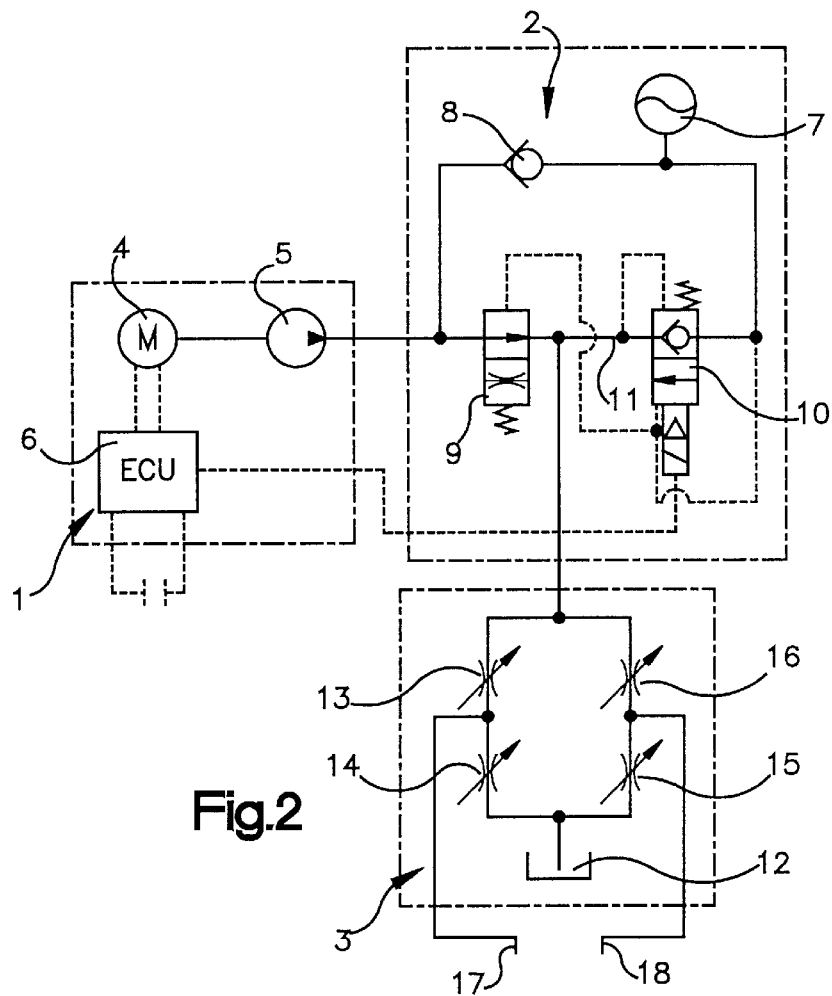
FIG. 2 is a symbolic representation of the method according to the invention

The method according to the invention shown symbolically in FIG. 2 may be divided into three functional units 1, 2, and 3. Functional unit 1 comprises an electric motor 4 driving a pump 5 to deliver a pressure fluid. An electronic control unit 6 is used to control the volume rate of flow as a function of demand, for example in a known standby mode, and to monitor current input to the motor.

Functional unit 2 comprises a hydraulic accumulator 7 that may be pressurized with pressure fluid by a non-return valve 8, an accumulator charging valve 9 controlled as a function of the pressure present in hydraulic accumulator 7, such that it is in a flow-through position if hydraulic accumulator 7 is charged and in a throttling position if hydraulic accumulator 7 is depleted, and a combined electromagnetically and pressure-actuated valve arrangement 10 permitting a demand-based supply of pressure fluid from hydraulic accumulator 7 in case of a sudden drop in the volume rate of flow in working line 11.

Finally, functional unit 3 comprises the hydraulic diagram, known per se of an open center steering valve of a power-assisted steering unit. The structure of a power-assisted steering unit typically comprises an input shaft connected to a steering rod, whereby the input shaft is connected via a torsion rod to an output shaft that is provided with a pinion engaging with the rack of a steering unit. A valve sleeve engaging with the output shaft surrounds the input shaft and represents the steering valve in which hydraulic pressure builds to assist the motion of the rack if the input shaft is twisted relative to the valve sleeve. In an open center steering valve, the input side is connected with the pressure side of pump 5 and the output side with a substantially pressureless reservoir 12 such that, in neutral position, there is a continuous low-pressure hydraulic flow through the valve.

Steering valve 3 functionally comprises two parallel throttling segments with controllable throttles 13 through 16. Depending on the direction of rotation of the relative torsion between input shaft and valve sleeve the resistance of throttles 13 and 15 is decreased with simultaneous increase of the resistance of throttles 14 and 16 or increased with simultaneous decrease in the resistance of throttles 14 and 16. This produces a pressure difference between working connections 17 and 18, which pressurizes a hydraulic cylinder to assist the steering movement.

If the hydraulic accumulator is charged and small or medium steering rates do not produce pressures above the critical pressure, the method according to the invention functions like a conventional OC steering system. Pump 5 delivers a volumetric flow through open accumulator charging valve 9 directly to steering valve 3. The pressure present in hydraulic accumulator 7 keeps accumulator charging valve 9 in its open position, for instance against the action of a spring. When a steering motion is executed, a corresponding volumetric flow is provided in known manner. For this purpose, it is possible to both measure the current input to the pump and to transmit signals from proximity sensors, pressure sensors or the like to the electronic control unit so as to switch, for example, from a standby mode to a predefined delivery rate. Non-return valve 8 and valve arrangement 10 keep charged accumulator 7 separated from the volumetric flow.

Assuming a hydraulic accumulator 7 that continues to be charged and high steering rates, system pressures are produced which, above a critical pressure, cause the volume rate of flow, and thus the steering volume flow, to decrease as shown in FIG. 1. With increasing system pressure, the current input to the electric motor increases. This is detected by electronic control unit 6 and transmitted to valve arrangement 10. The transmitted signals serve to control an electromagnet, which is used to move a closing unit blocking hydraulic accumulator 7. In the closed position of the closing unit, an equilibrium is established between the prevailing system pressure and the closing pressure on the one hand and the pressure of hydraulic accumulator 7 on the other hand. For this purpose, the magnetic force of the electromagnet applied to the closing unit compensates the changes in the system pressure produced by the steering motion. If, at a pressure above the critical pressure, the steering volume flow decreases, a simultaneous sudden drop occurs in the steering pressure present in valve arrangement 10, which influences the equilibrium established on the closing unit. The magnetic force applied to the closing unit is changed as a function of the system pressure present on the pressure side of pump 5 so as to overcompensate the steering pressure present in valve arrangement 10a with the consequence that the closing unit moves to its open position and the additionally required steering volume flow issues from hydraulic accumulator 7 as needed. This is accomplished by selecting a time constant influencing the steering signals for the valve arrangement in such a way that upon a sudden drop in the delivery pressure the magnetic force initially remains unchanged.

Assuming a discharged hydraulic accumulator 7, accumulator charging valve 9 passes to its throttle position. This causes a portion of the volume flow delivered by pump 5 to be directed via non-return valve 8 so as to charge hydraulic accumulator 7. The throttling of the volume flow produced by accumulator charging valve 9 causes the pressure in working line 11 to be lower than the pressure on the pressure side of pump 5. The signal transmitted from electronic control unit 6 to the electromagnet on valve arrangement 10a thus causes valve arrangement 10 to open. This enables a steering volume flow to pass through hydraulic accumulator 7 and through open valve arrangement 10 to steering valve 3. Thus, if hydraulic accumulator 7 is incompletely charged, an additional steering volume flow may be made available from hydraulic accumulator 7 if a "catch-up situation" occurs.

Figure 3:
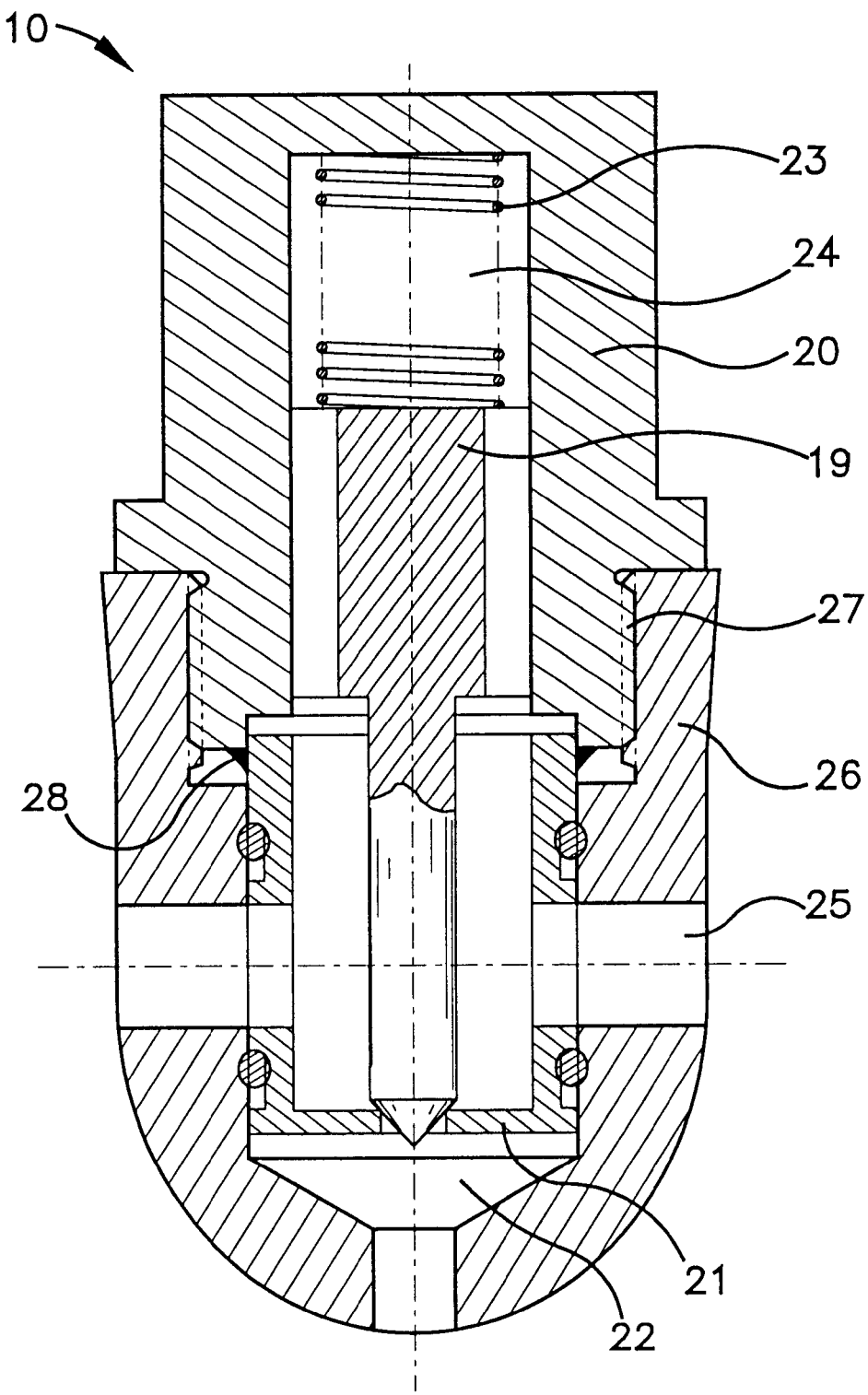
FIG. 3 is a sectional representation of a valve arrangement for controlling a hydraulic accumulator.

FIG. 3 shows an embodiment of a valve arrangement 10 according to the invention. This comprises an electromagnetically actuated slide valve 19 surrounded by a cylindrical electromagnet 20. One end of slide valve 19 closes off a valve seat 21, which opens into a conically tapering chamber 22. Chamber 22 is hydraulically connected with hydraulic accumulator 7 such that the pressure in chamber 22 corresponds to the hydrostatic pressure of hydraulic accumulator 7. On its side facing away from valve seat 21, slide valve 19 is spring-loaded in the direction of valve seat 21 by spring element 23. Spring element 23 is disposed in a chamber 24 that is hydraulically connected with a riser 25. Riser 25 is disposed in a housing portion 26 provided with an interior recess that extends orthogonally to riser 25 to receive valve seat 21. Furthermore, electromagnet 20 is screwed into housing portion 26 by means of a thread 27. Valve seat 21 is secured by welding to electromagnet 20.

The steering volume flow delivered by pump 5 passes through riser 25. This establishes a pressure in chamber 24 equal to the pressure present in riser 25 and pressurizes slide valve 19 in the direction of valve seat 21 in addition to spring element 23. The magnetic force produced by electromagnet 20 compensates this additional loading of slide valve 19.

Any changes in the system pressure present in riser 25 are transmitted via electronic control unit 6 for corresponding changes in the magnetic force; that is, overall, slide valve 19 presses against valve seat 21 only with the closing force of spring element 23. The closing force produced by spring element 23,is at least as great as the counter-acting opening force produced by the hydrostatic pressure in chamber 22 such that valve seat 21 remains closed in the absence of excitation of the electromagnet.

If a "catch-up situation" occurs due to a rapid steering maneuver, the decrease in steering volume flow that occurs above the critical pressure is accompanied by a pressure drop in riser 25 with the result that the pressure on slide valve 19 in chamber 24 is also reduced. Control unit 6 keeps the current supply to magnetic valve 20 constant within a predefined time span such that the magnetic force acting on slide valve 19 remains unchanged; that is, slide valve 19 moves to its open position as a result of the reduced pressure in chamber 24. The additionally required steering volume flow passes from hydraulic accumulator 7 via chamber 22 to riser 25 and compensates the existing decrease in volumetric flow as needed.

Figure 4:
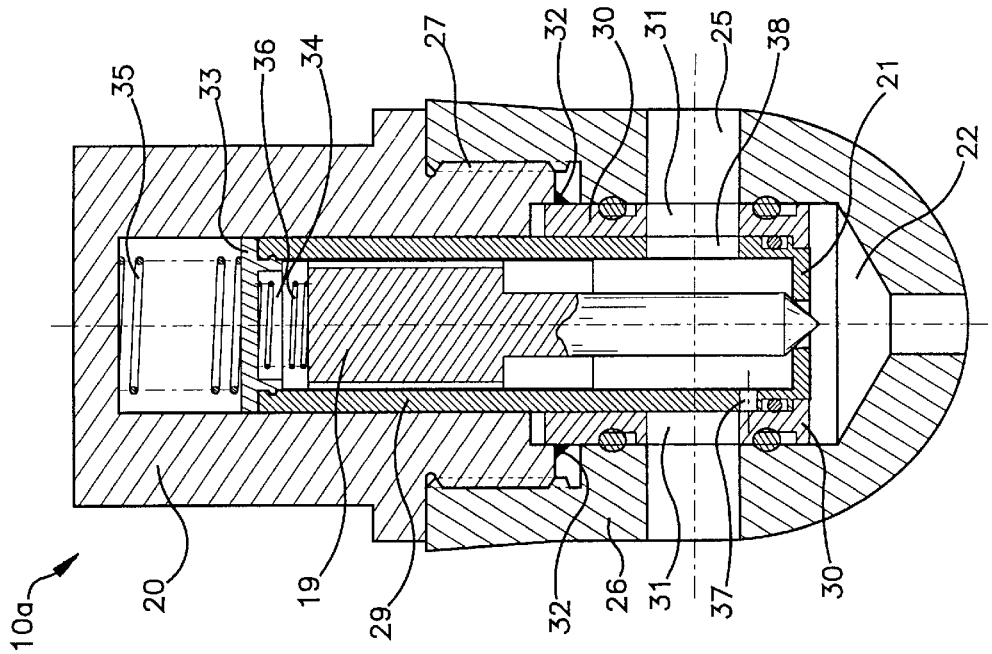
FIG. 4 is a sectional representation of a valve arrangement for controlling a hydraulic accumulator and throttling a steering volume flow with charged hydraulic accumulator.
Figure 5:
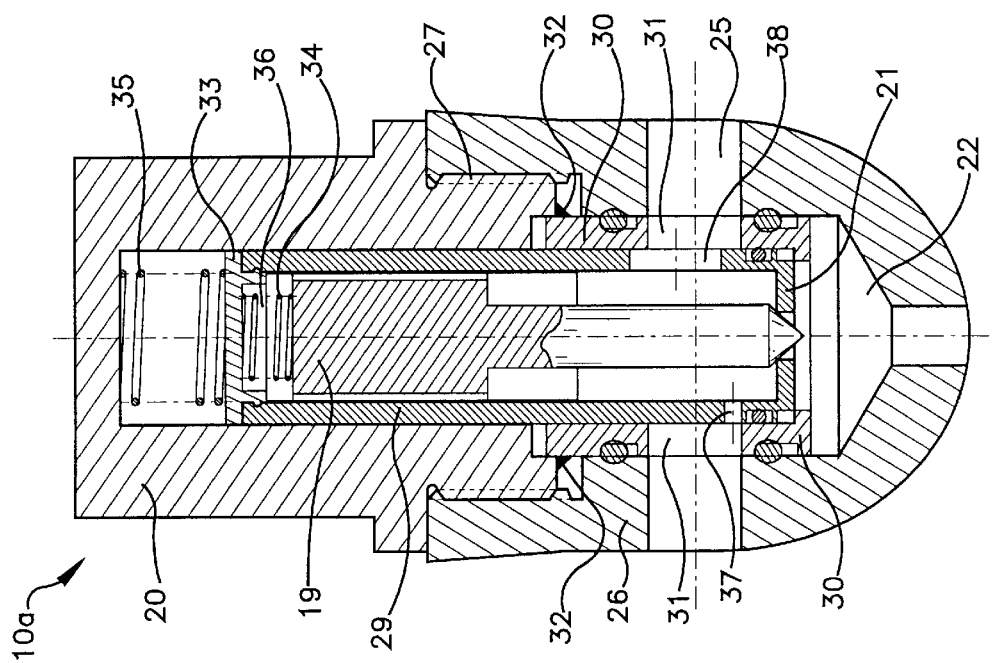
FIG. 5 is a sectional representation of the valve arrangement for controlling a hydraulic accumulator and throttling a steering volume flow according to FIG. 4 with depleted hydraulic accumulator.

FIGS. 4 and 5 show a modified valve arrangement 10a combining the functions of controlling the hydraulic actuator 7 and throttling actuator charging valve 9. The exterior design of valve arrangement 10a shown in FIGS. 4 and 5 differs from that of valve arrangement 10 shown in FIG. 3 in that slide valve 19 is carried in a sleeve 29. Sleeve 29 in turn can be displaced within a cylindrical recess of electromagnet 20 and a slide bush disposed in housing portion 26. Slide bush 30 is provided with a through-hole 31 that is aligned with riser 25. Slide bush 30 is fixed by welding connection 32 to electromagnet 20 which is screwed into housing portion 26.

Sleeve 29, at its one end face is provided with valve seat 21 and at its opposite end face is closed off with a cover element 33. A spring element 34 is inserted between cover element 33 and the end of slide valve 19 so as to load slide valve 19 in the direction of valve seat 21. A spring element 35 fits against the exterior of cover element 33 and with its other end is supported against an interior wall of electromagnet 20.

As in valve arrangement 10 shown in FIG. 3, the modified form of valve arrangement 10a according to FIGS. 4 and 5 also has a riser 25 through which passes the steering volume flow of steering valve 3. The respective pressure present in riser 25 as a function of the steering movement is also present in chamber 36 formed between cover element 33 and slide valve 19. Thus, slide valve 19 is pressurized in the direction of valve seat 21 by the spring force of spring element 34 and by the respective steering pressure. This is counteracted by the pressure of hydraulic accumulator 7 in chamber 22 and by the magnetic force produced by electromagnet 20 so as to compensate the steering pressure acting on slide valve 19 as a function of the system pressure present on the pressure side of pump 5. The respective changes in the system pressure during steering movements are again taken into account by controlling the magnetic force via electronic control unit 6. At zero current, that is, if electromagnet 20 is not excited and there is no pump activity, the closing pressure of spring element 34 keeps slide valve 19 in its closed position.

Sleeve 29 is provided with an inlet opening 37 and an outlet opening 38 in the area of riser 25 to permit flow through riser 25 if hydraulic actuator 7 is charged as shown in FIG. 4. If hydraulic accumulator 7 is charged, the pressure present in chamber 22, which pressurizes sleeve 29 in axial direction, is just high enough to compensate the counteracting spring force of spring element 35. In this case, inlet opening 37 is located in the area of riser 25. By contrast, if the pressure in hydraulic accumulator 7 decreases again due to loss of volume, the spring force of spring element 35 moves sleeve 29 in the direction of chamber 22 so that inlet opening 37 increasingly narrows and the steering volume flow passing through it is throttled. If hydraulic accumulator 7 is empty, inlet opening 37 is completely closed as shown in FIG. 5. In this position, the pressure upstream from valve arrangement 10 increases and hydraulic accumulator 7 is filled via non-return valve 8 shown in FIG. 2. As the pressure in hydraulic accumulator 7 increases, sleeve 29 moves back to its initial position shown in FIG. 4.

Displacement of sleeve 29 as a function of the pressure present in hydraulic accumulator 7 also causes slide valve 19 and valve seat 21 to be displaced so that the relative position of slide valve 19 and valve seat 21 does not change. Thus, if a "catch-up situation" occurs, slide valve 19 may move to its open position even if hydraulic accumulator 7 is still being charged so that the additionally required steering volume flow passes from chamber 22 into riser 25.

Valve arrangement 10*a* shown in FIGS. 4 and 5 comprises the process-based functions shown in FIG. 2 of the corresponding accumulator charging valve 9 and valve arrangement 10. This provides a high integration level and requires very little space and thus permits cost-effective production. Furthermore, spring element 35 makes it possible to adjust the pressure in hydraulic accumulator 7 so that valve arrangement 10*a* may be used as a modular component for a wide variety of applications.

Valve arrangements 10 and 10*a* shown in FIGS. 3, 4 and 5 represent respective embodiments according to the invention to implement the method shown in FIG. 2 for controlling the steering volume flow of a hydraulic power-assisted steering unit for motor vehicles. The method according to the invention permits very high hydraulic performance and is also suitable for use in heavy vehicles. The creation of functional units 1 through 3 furthermore provides a modular construction permitting the use of standard components, such as supply unit 1 or OC steering valve 3. This permits cost-effective production and simple assembly. In contrast to closed center steering valves, also referred to as CC steering valves, smaller hydraulic accumulators 7 may be used. Moreover, current load is lower and steering characteristics are far less critical. Thus, the method according to the invention with the use an OC steering valve can provide overall cost advantages.

List of Reference Numbers
1 supply unit
2 functional unit
3 OC steering valve
4 electric motor
5 pump
6 electronic control unit
7 hydraulic accumulator
8 non-return valve
9 accumulator charging valve
10 valve arrangement
10*a* valve arrangement
11 working line
12 reservoir
13 throttle
14 throttle
15 throttle
16 throttle
17 working connection
18 working connection
19 slide valve
20 electromagnet
21 valve seat
22 chamber
23 spring element
24 chamber
25 riser
26 housing portion
27 thread
28 welded connection
29 sleeve
30 slide bush
31 through-hole
32 welded connection
33 cover element
34 spring element
35 spring element
36 chamber
37 inlet opening
38 outlet opening

What is claimed is:

1. An apparatus for use with an open center steering valve (3) of a hydraulic power-assisted steering unit of a motor vehicle comprising:

an electric motor operated pump (5);

a hydraulic accumulator (7) for storing a pressurized quantity of hydraulic fluid, the hydraulic accumulator (7) being hydraulically connected to the pump (5), the pump (5) supplying the pressurized hydraulic fluid to the hydraulic accumulator (7);

a valve arrangement (10) for controlling hydraulic fluid flow from the hydraulic accumulator (7), the valve arrangement (10) having a riser (25), a slide valve (19), a valve seat (21), and an electromagnet, the riser (25) being hydraulically connected to the pump (5), the valve seat (21) having an opening which hydraulically connects the riser (25) and the hydraulic accumulator (7), the slide valve (19) being located within the electromagnet of the valve arrangement (10) and being movable by the electromagnet from a position blocking the valve seat opening and preventing hydraulic fluid flow from the accumulator (7) to the riser (25) to a position clearing the valve seat opening and allowing hydraulic fluid flow from the accumulator (7) to the riser (25); and an electronic control unit (6) for controlling the electromagnet and the movement of the slide valve (19).

2. The apparatus of claim 1 wherein the movement of the slide valve (19) is dependent upon the hydraulic pressure on a pressure side of the pump (5).

3. The apparatus of claim 1 wherein the valve arrangement (10) further comprises a spring element (23), the spring element (23) forcing the slide valve (19) toward the valve seat (21).

4. The apparatus of claim 3 wherein a pressure force applied to the valve seat (21) by the spring loaded slide valve (19) is at least as great as an opening force acting against the slide valve (19) due to pressure within the hydraulic accumulator (7).

5. The apparatus of claim 3 wherein an end of the slide valve (19) opposite the valve seat (21) is disposed in a chamber (24), the chamber (24) having a pressure that is equal to the pressure of the hydraulic fluid present in the riser (25).

6. The apparatus of claim 5 wherein chamber (24) is hydraulically connected with the riser (25).

7. The apparatus of claim 5 wherein the spring element (23) is disposed in chamber (24).

8. The apparatus of claim 1 wherein the slide valve (19) is displaceable in a direction oriented orthogonal to a longitudinal axis of the riser (25).

9. The apparatus of claim 8 wherein at least one section of the slide valve (19) is disposed so as to penetrate the riser (25).

10. An apparatus for use with an open center steering valve (3) of a hydraulic power-assisted steering unit of a motor vehicle comprising:

an electric motor operated pump (5);

a hydraulic accumulator (7) for storing a pressurized quantity of hydraulic fluid, the hydraulic accumulator (7) being hydraulically connected to the pump (5), the pump (5) supplying the pressurized hydraulic fluid to the hydraulic accumulator (7);

a valve arrangement (10) for controlling hydraulic fluid flow from the accumulator (7) and for throttling hydraulic fluid flow from the pump (5), the valve arrangement (10) having a riser (25), a slide valve (19), a valve seat (21), an electromagnet, and a displaceable sleeve (29), the riser (25) being hydraulically connected to the pump (5), the valve seat (21) having an opening which hydraulically connects the riser (25) and the hydraulic accumulator (7), the slide valve (19) being located within the electromagnet of the valve arrangement (10) and being movable by the electromagnet from a position blocking the valve seat opening and preventing hydraulic fluid flow from the accumulator (7) to the riser (25) to a position clearing the valve seat opening and allowing hydraulic fluid flow from the accumulator (7) to the riser (25), the displaceable sleeve (29) surrounding the slide valve (19) and being capable of throttling the hydraulic flow through the riser (25), a spring element (35) on a first end of the displaceable sleeve (29) applying pressure toward the valve seat (21) and hydraulic pressure from the hydraulic accumulator (7) on a second end of the displaceable sleeve (29) applying pressure opposite the spring pressure; and an electronic control unit (6) for controlling the electromagnet and the movement of the slide valve (19).

11. The apparatus of claim 10 wherein the slide valve (19) is movable in a direction parallel to an interior wall of the displaceable sleeve (29).

12. The apparatus of claim 10 wherein the displaceable sleeve (29) is disposed so as to penetrate the riser (25).

13. The apparatus of claim 12 wherein the displaceable sleeve (29) has an inlet opening (37) and an outlet opening (38), when the hydraulic accumulator (7) is pressurized each opening (37, 38) is located in an area of riser (25).

14. The apparatus of claim 13 wherein inlet opening (37) is displaceable from the area of riser (25) by displacement of the displaceable sleeve (29).

15. The apparatus of claim 14 wherein the outlet opening (38) has a diameter that equals a diameter of the riser (25), and the inlet opening (37) has a diameter that is smaller than the diameter of the riser (25).

16. The apparatus of claim 10 wherein the movement of the slide valve (19) is dependent upon the pressure present on a pressure side of pump (5).

17. The apparatus of claim 10 wherein slide valve (19) is spring-loaded toward the valve seat (21) by a spring element (34).

18. The apparatus of claim 17 wherein a pressure force of slide valve (19) applied against the valve seat (21) by spring element (34) is at least as great as an opening force acting against slide valve (19) from the pressure within the hydraulic accumulator (7).

19. The apparatus of claim 10 wherein an end of slide valve (19) opposite from valve seat (21) is disposed in a chamber (36) formed within the displaceable sleeve (29), the chamber (36) having a pressure that is equal to the hydraulic pressure present in the riser (25).

20. The apparatus of claim 19 wherein chamber (36) is hydraulically connected with the riser (25).

21. The apparatus of claim 19 wherein spring element (34) is disposed in chamber (36).

22. The apparatus of claim 10 wherein the slide valve (19) is displaceable in a direction oriented orthogonal to the longitudinal axis of the riser (25).

23. The valve arrangement (10) according to claim 22 wherein at least a section of slide valve (19) penetrates the riser (25).

* * * * *